United States Patent
Kai et al.

(10) Patent No.: US 6,739,757 B2
(45) Date of Patent: May 25, 2004

(54) BEARING UNIT

(75) Inventors: Kengo Kai, Fujisawa (JP); Yasushi Morita, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/045,614

(22) Filed: Oct. 25, 2001

(65) Prior Publication Data

US 2002/0090156 A1 Jul. 11, 2002

(30) Foreign Application Priority Data

Oct. 27, 2000 (JP) ........................................ 2000-328677

(51) Int. Cl.[7] ................................................ F16C 33/78
(52) U.S. Cl. ...................................................... 384/488
(58) Field of Search ................................. 384/480, 477, 384/144, 484, 488

(56) References Cited

U.S. PATENT DOCUMENTS 4,093,324 A * 6/1978 Carrigan ..................... 384/480
5,655,845 A * 8/1997 Lampart ..................... 384/480

FOREIGN PATENT DOCUMENTS

JP          11-325089          11/1999

* cited by examiner

*Primary Examiner*—Lenard A. Footland
(74) *Attorney, Agent, or Firm*—Katten Muchin Zavis Rosenman

(57) ABSTRACT

A bearing unit comprising a bearing having an inner ring, an outer ring and a plurality of rolling elements arranged so as to be freely rotatable between the inner ring and the outer ring, and a sealing device arranged on axially opposite sides of the bearing, wherein the sealing device has a fixed ring spacer, a rotating ring spacer, and a non-contact seal section attached to the rotating ring spacer and extending towards the fixed ring spacer to be maintained in a non-contact condition with respect to the fixed ring spacer.

10 Claims, 5 Drawing Sheets

BEARING UNIT

BACKGROUND OF THE INVENTION

1. Industrial Field of the Invention

The present invention relates to a bearing unit for supporting a main shaft of a machine tool or a rotation shaft of a motor, in a grease lubricated condition.

2. Description of the Prior Art

In angular contact ball bearings, cylindrical roller bearings or tapered roller bearings for supporting a shaft which rotates at high speed such as a main shaft of a high speed machine, the prevention of contamination with foreign matter is generally effected by providing a sealing device such as a labyrinth seal on the side of the apparatus to be used, with no sealing device provided for the bearing. On the other hand, a bearing has also been developed in which leakage of internally filled grease and contamination with foreign matter are prevented, by having a built in sealing device. However in order to install such a sealing device, special specifications such as a wider width are required. Furthermore, heat release effectiveness is reduced, and so grease life tends to be short.

In particular in the case of machine tools, due to problems with heat which has an affect on machining accuracy, the use of contact type seals is avoided, which causes difficulties. Consequently, it is common to provide multi-step labyrinth seals.

From this view point, angular contact ball bearings, cylindrical roller bearings or tapered roller bearings for supporting a main shaft of a machine tool or a rotation shaft of a motor which rotate at high speed, are of the open type with good heat dissipation. It is thus necessary to consider the influence in the case where cutting fluid, foreign matter or the like during machining passes through a sealing device provided on the shaft or housing, and infiltrates into the bearing interior. Furthermore, since the leakage of grease from the bearing interior occurs easily, the lubricated condition of the bearing deteriorates.

Therefore, in order to prevent the infiltration of foreign matter, a sealing device such as a multi-step labyrinth seal is provided on the shaft or the housing. Furthermore, prevention of infiltration is effected mechanically with air purge using the flow of air. Alternatively, this is also effected by providing a non-contact type seal in the bearing itself. However, in this case, there is a problem in that foreign matter infiltrates in through the gap of several hundred microns to several millimeters inherent with non-contact type seals such as labyrinth seals, and grease leaks out, so that the sealing effect is insufficient.

There is also a case where such a problem can be solved by a bearing in which a contact type sealing device is provided. However, as mentioned above, by providing such a sealing device, the heat dissipation effect is reduced. Moreover, in cases for example where a combined bearing unit is used, a pressure difference between the inside and outside occurs with temperature change of the bearing interior, and when the interior of the combined bearing unit becomes a low pressure, cutting fluid or foreign matter is drawn in from the outside, and the sealing effect cannot be maintained. In the case where cutting fluid or foreign matter enters the bearing interior or grease leaks out, bearing failing at an early stage is likely. In order to prevent this, maintenance over a relatively short cycle is necessary. Hence running costs are increased.

SUMMARY OF THE INVENTION

An objective of the present invention, taking into consideration such problems, is to provide a bearing unit which can effectively suppress the infiltration of foreign matter to inside the bearing, and which can effectively suppress the leakage of grease.

Another object of the present invention is to provide a bearing unit which comprises; a bearing having an inner ring, an outer ring and at least one row of rolling elements arranged so as to be freely rotatable between the inner ring and the outer ring, and a sealing device arranged on axially either side of the bearing, wherein the sealing device has a fixed ring spacer, a rotating ring spacer, and a non-contact seal section attached to one of the fixed ring spacer and the rotating ring spacer and extending towards the other to maintain in a non-contact condition with respect to the other.

BRIEF DESCRIPTION OF THE DRAWINGS

FIG. 4(*b*) is a top plan view to show the bearing unit, viewed in a radial direction thereof, according to the fourth embodiment of the present invention.

FIG. 5(*b*) is a top plan view to show the bearing unit, viewed in a radial direction thereof, according to the fifth embodiment of the present invention.

FIG. 6(*b*) is a top plan view to show the bearing unit, viewed in a radial direction thereof, according to the sixth embodiment of the present invention.

DETAILED DESCRIPTION OF THE PREFERRED EMBODIMENTS

Figure 1:
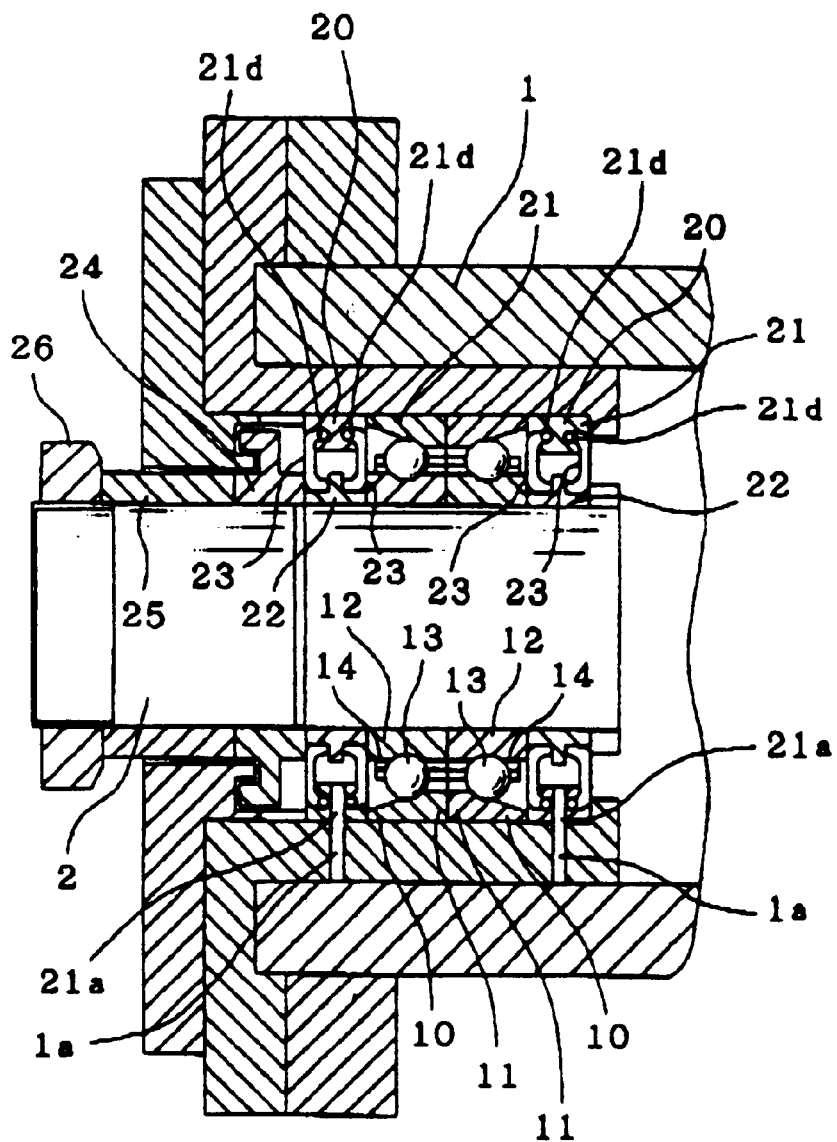
FIG. 1 is an axial cross-section showing the vicinity of a main shaft of a machine tool including a bearing unit according to a first embodiment of the present invention.

According to an embodiment of the present invention, the bearing unit comprises a bearing of a double row type or single row type having an inner ring, an outer ring and a plurality of rolling elements arranged so as to be freely rotatable between the inner ring and the outer ring, and a sealing device arranged on axially opposite sides of the bearing, wherein the sealing device has a fixed ring spacer, a rotating ring spacer, and a non-contact seal section attached to one of the fixed ring spacer and the rotating ring spacer and extending towards the other, and maintained in a non-contact condition with respect to the other. Therefore by making the bearing an open type, changes in air pressure between the inside and outside of the bearing do not occur even with the occurrence of temperature change, and hence the drawing-in of foreign matter is suppressed. Moreover, due to the sealing devices formed on opposite sides of the bearing, leakage of grease, and infiltration of foreign matter from the outside can be effectively suppressed. Here, the single row type has a single row of rolling elements and the double row type has two rows of rolling elements.

The situation is also considered where, by using centrifugal force or the like, the non-contact seal is made to slightly contact with the rotating ring spacer when stopped or during low speed rotation. As a result, the seal characteristics of the non-contact seal which are deteriorated when stopped or during low speed rotation, are compensated for so that higher sealing characteristics can be obtained.

Preferably, at least one of an oil drain passage and an air vent passage which are open to the outside is provided in the sealing device.

Hereunder is a detailed description of embodiments of the present invention with reference to the drawings.

FIG. 1 is an axial cross-section showing the vicinity of a main shaft of a machine tool including a bearing unit according to a first embodiment of the present invention. A bearing 10 of the double row type is comprised of an outer ring 11, an inner ring 12, a plurality of rolling elements, specifically balls 13, arranged so as to be freely rotatable between the two rings 11 and 12, and a cage 14 for retaining the balls 13 in each row, and filled with grease thereinside. The outer ring 11 is attached to a housing 1 while the inner ring 12 is engaged on a shaft 2.

A pair of sealing devices 20 are arranged on axial opposite sides of the bearing 10, respectively. Since the sealing devices 20 both have the same construction, only one sealing device 20 will be described (hereunder the same applies unless specifically shown). Each of the sealing devices 20 has a fixed ring spacer 21 mounted on the housing 1, a rotating ring spacer 22 engaged with the shaft 2, and non-contact seals 23 mounted in circumferential grooves 21d formed in an inner periphery of the fixed ring spacer 21 in the vicinity of opposite axial ends thereof to extend toward the rotating ring spacer 22. The inner peripheral edges of the non-contact seals 23 do not contact with the rotating ring spacer 22.

An oil drain/air vent passage 21a extending radially outward is formed in a part of the fixed ring spacer 21 of each sealing device 20. The oil drain/air vent 21a is communicated with the outside via hole 1a formed in the housing 1. The sealing devices 20 are pressingly secured via spacers 24 and 25, by a nut 26 threaded onto an end of the shaft 2. The bearing unit is thus constructed by the bearing 10 and the sealing devices 20.

Since the bearing 10 is of an open type, during operation of the bearing unit, any changes in air pressure between the inside and outside of the bearing 10 do not occur even with the occurrence of the temperature change, and hence the drawing-in of foreign matter from the outside is suppressed. Moreover, due to the sealing devices 20 formed on the opposite sides of the bearing 10, leakage of grease, and infiltration of foreign matter from the outside can be effectively suppressed. Since the sealing devices 20 are open to the outside via the oil drain/air vent passages 21a and the holes 1a formed in the housing 1, then also in the case where foreign matter or moisture gets past the non-contact seals 23 to inside the sealing devices 20, this can be promptly ejected.

The situation is also considered where, by using centrifugal force or the like, the non-contact seals 23 are made to slightly contact (contact with a slight seal pressure) with the rotating ring spacer 21 when stopped or during low speed rotation. As a result, the seal characteristics of the non-contact seals 23 which are deteriorated when stopped or during low speed rotation, are compensated for so that higher sealing characteristics can be obtained. Here, it is considered that even if the non-contact seals 23 are slightly contacted, since, when stopped, there is no heat generated, while, during low speeds, any heat generated is insignificant, there is no particular problem.

Figure 2:
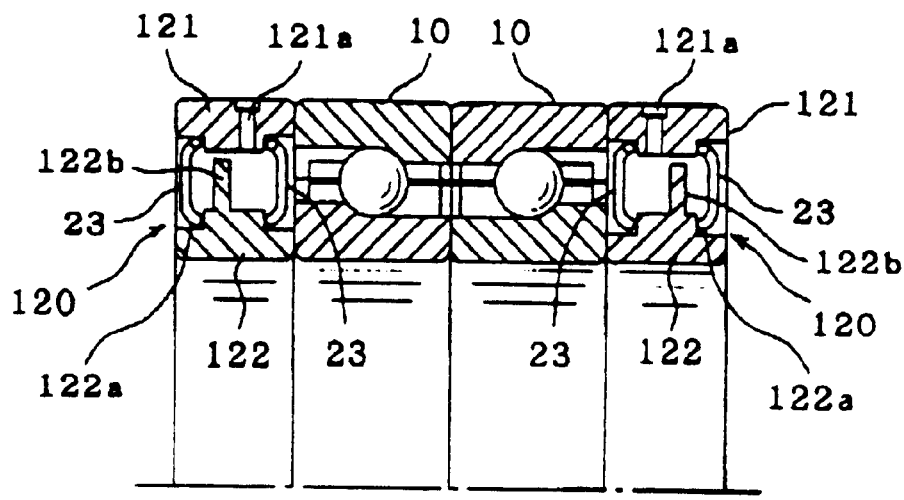
FIG. 2 is a cross sectional view to show a half of a bearing unit according to a second embodiment of the present invention.

FIG. 2 shows a bearing unit according to a second embodiment. In the embodiment in FIG. 2, only the shape of the rotating ring spacer of the sealing device is different from that in the aforementioned embodiment, and hence common construction members are denoted by the same reference symbols and description is omitted.

In each of the sealing devices 120 shown in FIG. 2, a first flange 122b extends towards the fixed ring spacer 121 from an outer peripheral face of the rotating ring spacer 122. The outer peripheral edge of the first flange 122b does not contact with the fixed ring spacer 121, but is arranged with a slight clearance between them. In this way, according to this embodiment, in addition to the non-contact seals 23, a labyrinth function can be given to between the first flange 122b provided in the interior of the sealing devices 120 and the inner peripheral face of the fixed ring spacer 121. Hence the sealing effect can be increased.

Figure 3:
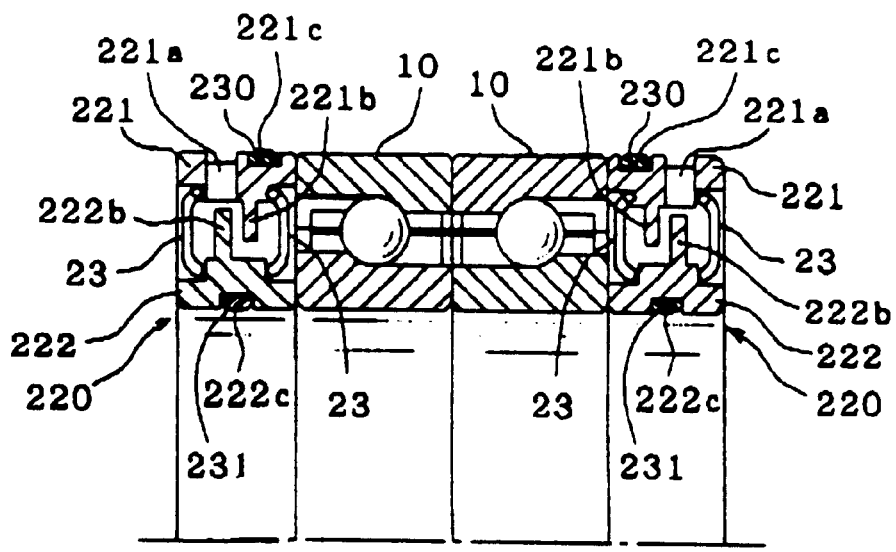
FIG. 3 is a cross sectional view to show a half of a bearing unit according to a third embodiment of the present invention.

FIG. 3 shows a bearing unit according to a third embodiment. In the embodiment in FIG. 3, only the shape of the fixed ring spacer and the rotating ring spacer of the sealing device is different from that in the second embodiment, and hence common construction members are denoted by the same reference symbols and description is omitted.

In each of the sealing devices 220 shown in FIG. 3 a second flange 221b extends towards a rotating ring spacer 222 from an inner peripheral face of a fixed ring spacer 221 so as to be parallel with a slight clearance but not in contact with the first flange 222b extending from the outer peripheral face of the rotating ring spacer 222. The inner peripheral edge of the second flange 221b also does not contact with the rotating ring spacer 222. In this way, according to this embodiment, in addition to the non-contact seal 23, a narrow clearance labyrinth space due to the first and second flanges 221b and 222b provided in the interior of the sealing device 220, is formed longer and hence the sealing effect can be further increased.

In addition, according to this embodiment, by forming circumferential groove 221c in the outer peripheral face of the fixed ring spacer 221, and placing an O-ring 230 therein, infiltration of foreign matter from the outside through any clearance between the housing 1 and the outer peripheral face of the sealing devices 220 can be suppressed. On the other hand, by forming a peripheral groove 222c in the inner peripheral face of the rotating ring spacer 222, and placing an O-ring 231 therein, infiltration of foreign matter from the outside through any clearance between the shaft 2 and the inner peripheral face of the sealing devices 220 can be suppressed.

Figure 4A:
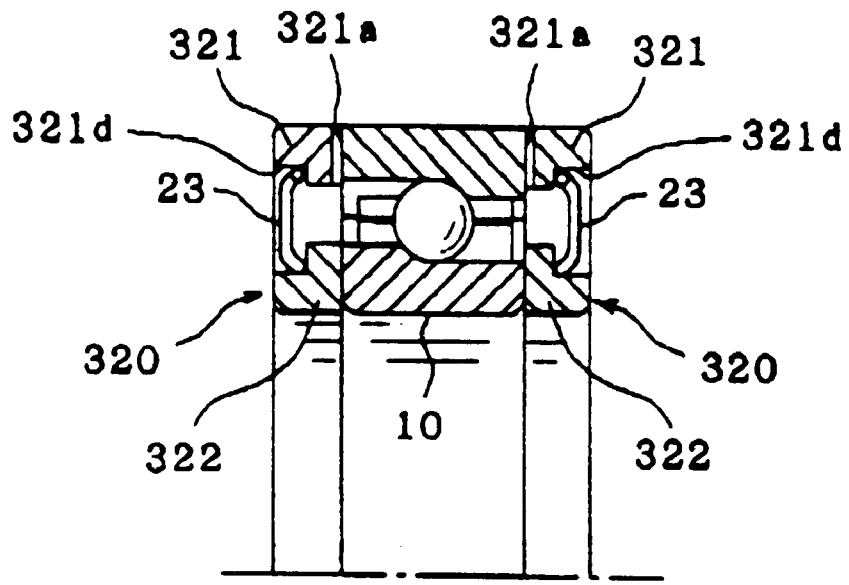
FIG. 4(*a*) is a cross sectional view to show a half of a bearing unit according to a fourth embodiment of the present invention.
Figure 4B:
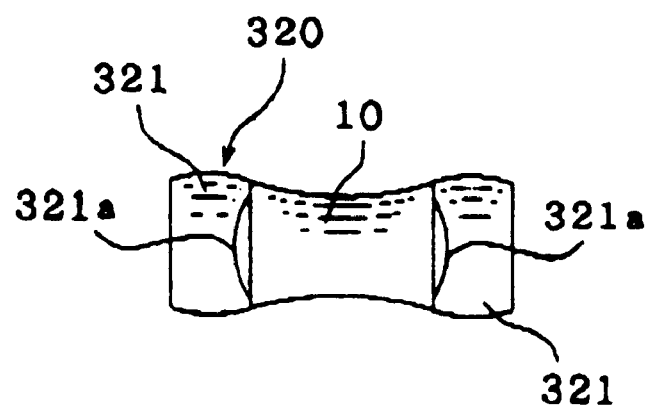

FIG. 4 shows a bearing unit according to a fourth embodiment, FIG. 4(a) being a cross-section and FIG. 4(b) being a view in the radial direction from outside. In the embodiment of FIG. 4, compared to the embodiment of FIG. 1 the bearing is of a single row type, and the shape of the sealing device is different. Common construction members are denoted by the same reference symbols and description is omitted.

In FIG. 4(a), a circumferential groove 321d is formed in only one side (the farther side from the bearing 10) of the inner peripheral face of the fixed ring spacer 321 of each sealing device 320 for attachment of the non-contact seal 23, which is different from the above mentioned embodiments. The construction itself of the non-contact seal 23 is the same as for the above mentioned embodiments. Furthermore, in the fixed ring spacer 321 of the sealing device 320, as shown in FIG. 4(b) a circular arc-shaped notch 321a is formed in the end face thereof on the side of the bearing 10. Hence, even with the sealing devices 320 abutted against the bearing 10, the notch 321a forms a clearance between the sealing devices 320 and the outer ring of the bearing 10, thereby functioning as an oil drain passage or air vent passage for discharging lubricating oil or foreign matter.

Figure 5A:
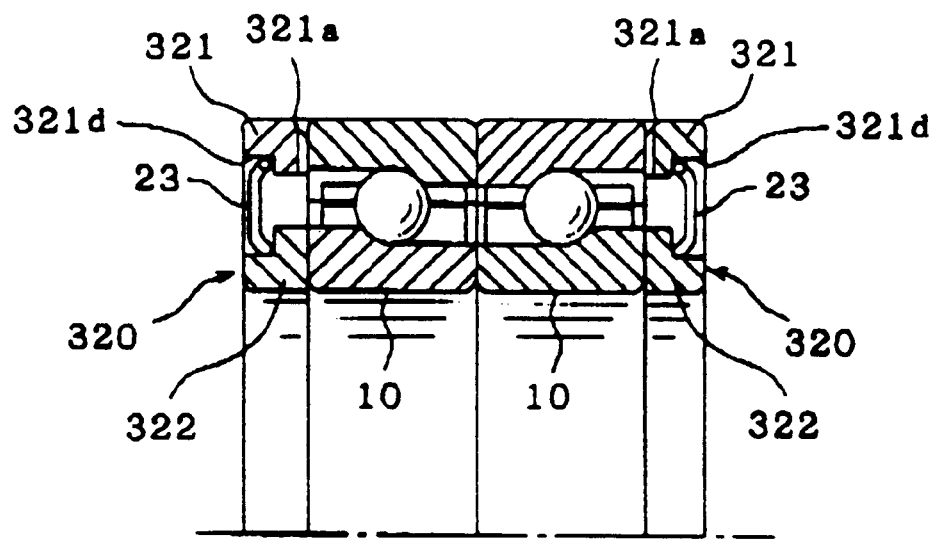
FIG. 5(*a*) is a cross sectional view to show a half of a bearing unit according to a fifth embodiment of the present invention.
Figure 5B:
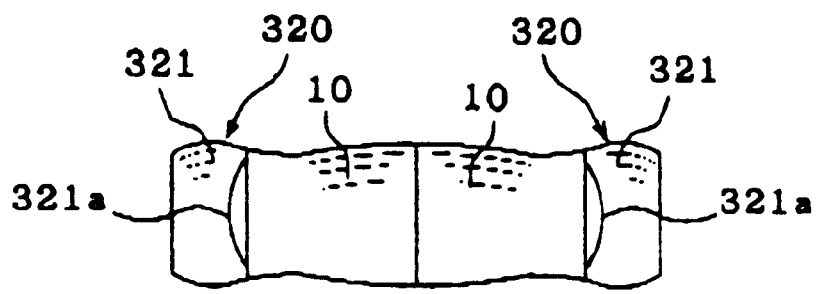

FIG. 5 shows a bearing unit according to a fifth embodiment, FIG. 5(a) being a cross section and FIG. 5(b) being a view in the radial direction from outside. In the embodiment of FIG. 5, the difference from the embodiment of FIG. 4 is only in that the bearing is of a double row type, and therefore other common construction members are denoted by the same reference symbols and description is omitted.

Figure 6A:
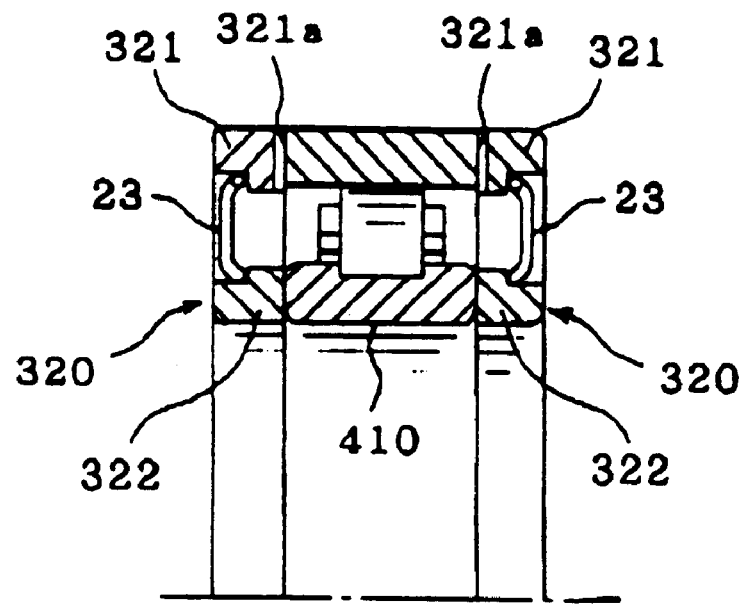
FIG. 6(*a*) is a cross sectional view to show a half of a bearing unit according to a sixth embodiment of the present invention.
Figure 6B:
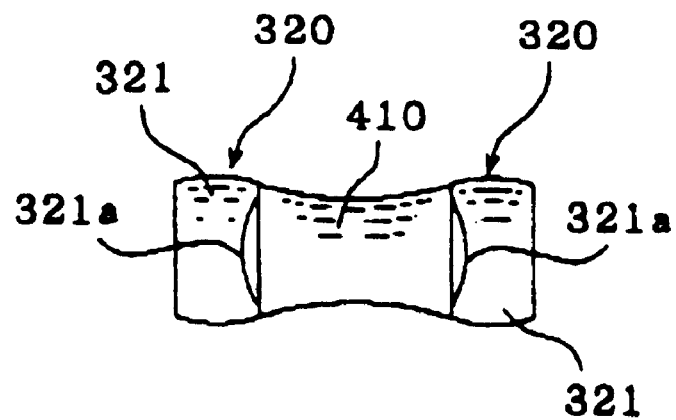

FIG. 6 shows a bearing unit according to a sixth embodiment, FIG. 6(a) being a cross section and FIG. 6(b) being a view in the radial direction from the outside. In the embodiment of FIG. 6, the difference from the embodiment of FIG. 5 is only in that the bearing is a cylindrical roller bearing 410, and other common construction members are denoted by the same reference symbols and description is omitted.

While the present invention has been described with reference to the embodiments, the present invention is not to be interpreted as being limited to these embodiments, and it will be understood that appropriate changes and improvements are also possible. For example the non-contact seal may be mounted on the rotating ring spacer side, and extend to a position short of or just before contacting with the fixed ring spacer side.

The bearing unit of the present invention comprises; a bearing of a single row type or double row type having an inner ring, an outer ring and a plurality of rolling elements arranged so as to be freely rotatable between the inner ring and the outer ring, and a seal device arranged on axially either side of the bearing, wherein the seal device has a fixed ring spacer, a rotating ring spacer, and a non-contact seal section attached to one of the fixed ring spacer and the rotating ring spacer and extending towards the other, and maintained in a non-contact condition with respect to the other. Therefore by making the bearing an open type, changes in air pressure between the inside and outside of the bearing do not occur even with the occurrence of temperature change, and hence the drawing in of foreign matter is suppressed. Moreover, due to the sealing devices formed on opposite sides of the bearing, leakage of grease, and infiltration of foreign matter from the outside can be effectively suppressed.

What is claimed is:

1. A bearing unit comprising a bearing having an inner ring, an outer ring and at least one row of rolling elements arranged so as to be freely rotatable between the inner ring and the outer ring, and a sealing device arranged on axially opposite sides of the bearing, wherein the sealing device has a fixed ring spacer, a rotating ring spacer, a non-contact seal section attached to one of the fixed ring spacer and the rotating ring spacer to be maintained in a non-contact condition with respect to the other, and an oil drain passage being open to the outside and provided in the fixed ring spacer.

2. The bearing unit of claim 1, wherein the rotating ring spacer has an outer peripheral surface formed with a first flange extending toward the fixed ring spacer from the outer peripheral surface.

3. The bearing unit of claim 2, wherein the fixed ring spacer has an inner peripheral surface formed with a second flange extending toward the rotating ring spacer from the inner peripheral surface.

4. A bearing unit comprising a bearing having an inner ring, an outer ring and at least one row of rolling elements arranged so as to be freely rotatable between the inner ring and the outer ring, and a sealing device arranged on axially opposite sides of the bearing, wherein the sealing device has a fixed ring spacer, a rotating ring spacer, a non-contact seal section attached to one of the fixed ring spacer and the rotating ring spacer and extending towards the other of the fixed ring spacer and the rotating ring spacer to be maintained in a non-contact condition with respect to the other, and an air vent passage being open to the outside and provided in the fixed ring spacer.

5. The bearing unit of claim 4, wherein the rotating ring spacer has an outer peripheral surface formed with a first flange extending toward the fixed ring spacer from the outer peripheral surface.

6. The bearing unit of claim 5, wherein the fixed ring spacer has an inner peripheral surface formed with a second flange extending toward the rotating ring spacer from the inner peripheral surface.

7. A hearing unit for use between a housing and a shaft; comprising an outer ring mounted to the housing, an inner ring fitted onto the shaft, and at least one row of rolling elements arranged so as to be freely rotatable between the inner ring and the outer ring, a cage for retaining the rolling elements in each row, a fixed ring spacer mounted to the housing and having an inner peripheral surface formed with a circumferential groove near an axial end thereof, a rotating ring spacer fitted onto the shaft, and a non-contact seal mounted into the circumferential groove of the fixed ring spacer and extending towards the rotating ring spacer to be maintained in a non-contact condition with respect to the rotating ring spacer.

8. The bearing unit of claim 7, wherein the fixed ring spacer has an oil drain/air vent passage open to the outside.

9. The bearing unit of claim 7, wherein the rotating ring spacer has an outer peripheral surface fanned with a first flange extending toward the fixed ring spacer from the outer peripheral surface to form a labyrinth seal between the first flange and the inner peripheral surface of the fixed ring spacer.

10. The bearing unit of claim 7, wherein the rotating ring spacer has an outer peripheral surface formed with a first flange extending toward the fixed ring spacer from the outer peripheral surface while the fixed ring spacer has an inner peripheral surface formed with a second flange extending toward the rotating ring spacer from the inner peripheral surface to form a labyrinth seal between the first flange and the second flange.

* * * * *